US012690008B2

(12) United States Patent
Resor

(10) Patent No.: US 12,690,008 B2
(45) Date of Patent: Jul. 21, 2026

(54) SIGNAL SOURCE MOBILITY STATUS CLASSIFICATION

(71) Applicant: QUALCOMM Incorporated, San Diego, CA (US)

(72) Inventor: George Wilcox Resor, Wilson, WY (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 17/987,027

(22) Filed: Nov. 15, 2022

(65) Prior Publication Data

US 2024/0163838 A1     May 16, 2024

(51) Int. Cl.
*H04W 64/00* (2009.01)

(52) U.S. Cl.
CPC ................................. *H04W 64/006* (2013.01)

(58) Field of Classification Search
CPC ..... H04W 4/029; H04W 64/00; H04W 4/025; H04W 64/003; H04W 52/0251; H04W 36/324; H04W 4/027; H04W 52/0225; H04W 84/005; H04W 72/51; H04W 8/20; H04W 36/302; H04W 36/32; H04W 40/20

See application file for complete search history.

(56) References Cited

U.S. PATENT DOCUMENTS

| | | | |
|---|---|---|---|
| 10,251,148 B2 | 4/2019 | Collet et al. | |
| 2007/0083296 A1* | 4/2007 | Tengler | G08G 1/096716 701/1 |
| 2012/0014425 A1* | 1/2012 | Zhuang | H04W 4/027 455/67.11 |
| 2012/0194387 A1* | 8/2012 | Faragher | G01S 5/0221 342/386 |
| 2014/0171088 A1* | 6/2014 | Edara | H04W 36/302 455/440 |
| 2014/0247807 A1* | 9/2014 | Westerberg | H04W 36/34 370/331 |
| 2019/0028943 A1* | 1/2019 | Wang | H04W 8/065 |
| 2022/0312169 A1* | 9/2022 | Cao | H04W 4/027 |

OTHER PUBLICATIONS

Cui Y., et al., "KNN search-based trajectory cloaking against the Cell-ID tracking in cellular network", Soft Computing, Springer Berlin Heidelberg, vol. 24, No. 2, Mar. 30, 2019, pp. 965-980, XP036980912, paragraph [02.2].
International Search Report and Written Opinion—PCT/US2023/075107—ISA/EPO—Jan. 18, 2024.

(Continued)

*Primary Examiner* — Kwasi Karikari
(74) *Attorney, Agent, or Firm* — Weaver Austin Villeneuve & Sampson LLP

(57) ABSTRACT

A signal source mobility status method includes: obtaining, at an apparatus, at least one identifier that is associated with one or more devices including a signal source that is configured to transmit wireless signals and whose mobility status is unknown to the apparatus; and determining, at the apparatus based on the at least one identifier, whether an expected mobility status of the signal source is mobile or stationary.

21 Claims, 12 Drawing Sheets

(56)                References Cited

OTHER PUBLICATIONS

Qualcomm Incorporated: "Discussion of Radio Cells versus Fixed Location Areas", SA WG2 Meeting #141e, R2-2010696, 3rd Generation Partnership Project, Mobile Competence Centre, 650, Route Des Lucioles, F-06921 Sophia-Antipolis Cedex, France, vol. SA WG2, No. e-Meeting, Oct. 12-Oct. 23, 2020, Oct. 26, 2020, XP052363725, 11 Pages.

Zte, et al., "Discussion on mobility enhancement", 3GPP TSG-RAN WG2 Meeting #120, R2-2211812, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14-Nov. 18, 2022, Nov. 4, 2022, XP052215916, 7 Pages.

* cited by examiner

From 10034-1530

800

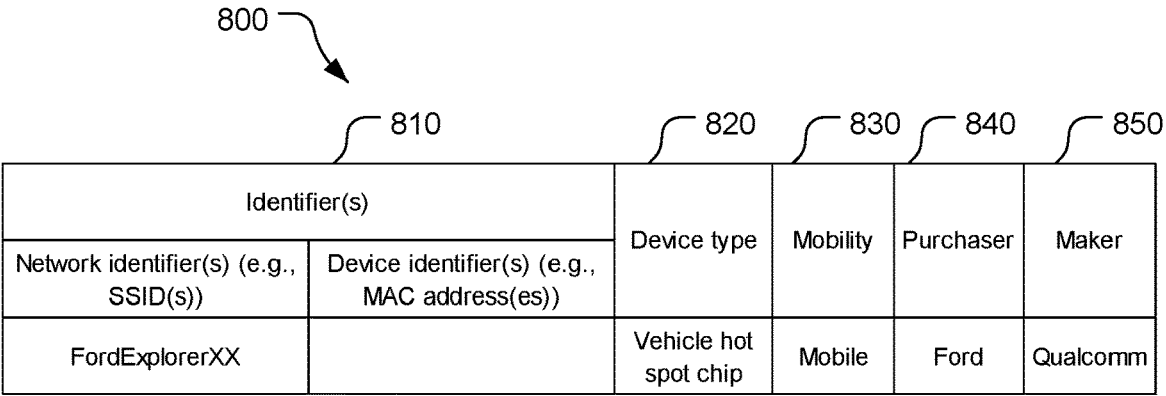

| Identifier(s) | | Device type | Mobility | Purchaser | Maker |
|---|---|---|---|---|---|
| Network identifier(s) (e.g., SSID(s)) | Device identifier(s) (e.g., MAC address(es)) | | | | |
| FordExplorerXX | | Vehicle hot spot chip | Mobile | Ford | Qualcomm |

| Identifier(s) | | Device type | Mobility | Purchaser | Maker |
|---|---|---|---|---|---|
| Network identifier(s) (e.g., SSID(s)) | Device identifier(s) (e.g., MAC address(es)) | | | | |
| | 00-02-A5-BA-87-01 through 00-02-A5-BA-87-C3 | | Stationary | | |

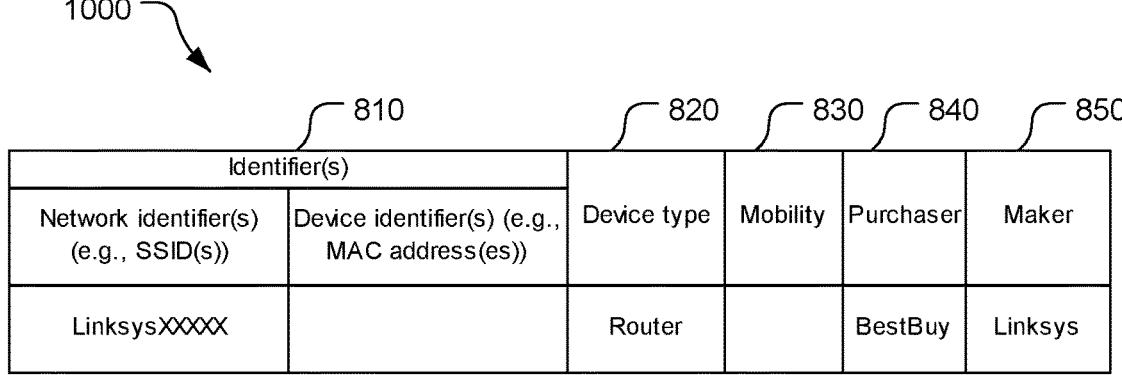

| Identifier(s) | | Device type | Mobility | Purchaser | Maker |
|---|---|---|---|---|---|
| Network identifier(s) (e.g., SSID(s)) | Device identifier(s) (e.g., MAC address(es)) | | | | |
| LinksysXXXXX | | Router | | BestBuy | Linksys |

| Identifier(s) | | Device type | Mobility | Purchaser | Maker |
|---|---|---|---|---|---|
| Network identifier(s) (e.g., SSID(s)) | Device identifier(s) (e.g., MAC address(es)) | | | | |
| FordExplorerXX | | Vehicle hot spot chip | Mobile | Ford | Qualcomm |
| SeesAllYY-SeesALLZZ | | Security camera | | | |
| | 00-02-A5-BA-87-01 through 00-02-A5-BA-87-C3 | | Stationary | | |
| | E8-06-88-04-CA-AA through E8-06-88-04-CD-AA | Tablets | | | |
| | E8-06-88-04-00-AA through E8-06-88-04-52-FF | Phones | Mobile | | |
| LinksysXXXXX | | Router | Stationary | Linksys | |

810  820  830  840  850

1120

1110

1130

1200

| Identifier(s) | | Location | Time | Mobility |
|---|---|---|---|---|
| Network identifier(s) (e.g., SSID(s)) | Device identifier(s) (e.g., MAC address(es)) | | | |
| | 00-02-A5-BA-87-01 | | | Mobile |

| Identifier(s) | | Location | Time | Mobility |
|---|---|---|---|---|
| Network identifier(s) (e.g., SSID(s)) | Device identifier(s) (e.g., MAC address(es)) | | | |
| | E8-06-88-04-CB-05 | Lat1, Long1 | T1 | |

| Identifier(s) | | Device type | Mobility | Purchaser | Maker |
|---|---|---|---|---|---|
| Network identifier(s) (e.g., SSID(s)) | Device identifier(s) (e.g., MAC address(es)) | | | | |
| FordExplorerXX | | Vehicle hot spot chip | Mobile | Ford | Qualcomm |
| SeesAllYY-SeesALLZZ | | Security camera | | | |
| | 00-02-A5-BA-87-02 through 00-02-A5-BA-87-C3 | | Stationary | | |
| | E8-06-88-04-CA-AA through E8-06-88-04-CB-04 and E8-06-88-04-CB-06 through E8-06-88-04-CD-AA | Tablets | | | |
| | | Phones | Mobile | | |
| LinksysXXXXX | | Router | Stationary | Linksys | |
| | 00-02-A5-BA-87-01 | | | Mobile | |
| | E8-06-88-04-CB-05 | | Stationary | | |

| Identifier(s) | | Device type | Purchaser | Maker |
|---|---|---|---|---|
| Network identifier(s) (e.g., SSID(s)) | Device identifier(s) (e.g., MAC address(es)) | | | |
| SeesAllYY-SeesALLZZ | | Security camera | | |
| | 00-02-A5-BA-87-02 through 00-02-A5-BA-87-C3 | | | |
| LinksysXXXXX | | Router | Linksys | |
| | E8-06-88-04-CB-05 | | | |

1600

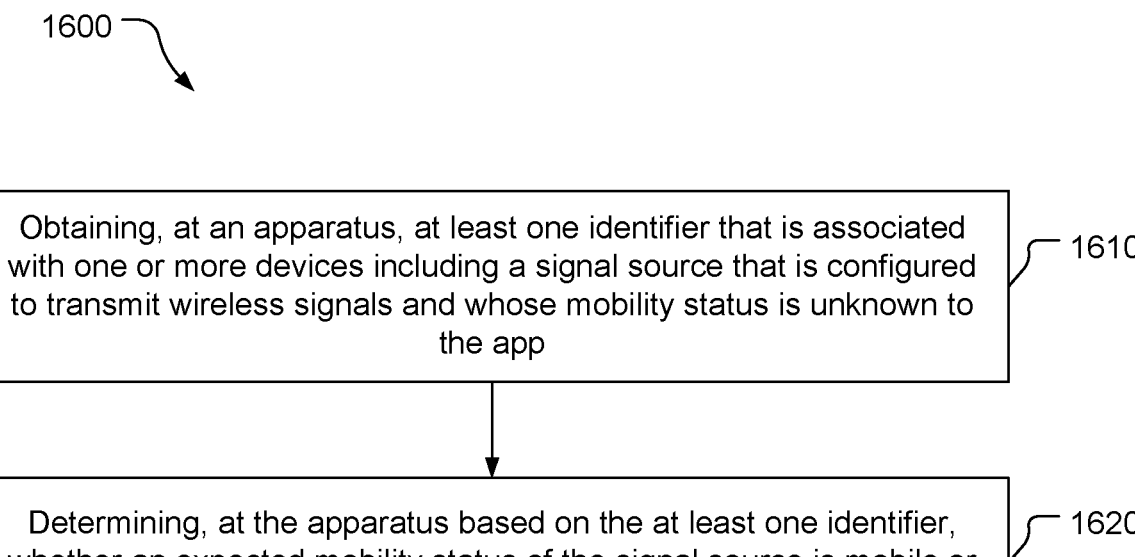

Obtaining, at an apparatus, at least one identifier that is associated with one or more devices including a signal source that is configured to transmit wireless signals and whose mobility status is unknown to the app — 1610

Determining, at the apparatus based on the at least one identifier, whether an expected mobility status of the signal source is mobile or stationary — 1620

FIG. 16

Providing mobility information / assistance data with mobile devices filtered out — 1700

FIG. 17

SIGNAL SOURCE MOBILITY STATUS CLASSIFICATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

It is often desirable to determine a position estimate for a mobile device based on signals from signal sources. Determining the position estimate may be complicated by new signal sources (e.g., access points) being introduced and observed without the mobile device (and/or perhaps another entity such as a server for mobile-assisted positioning) knowing whether a new signal is stationary (and thus has a reliable reference location) or mobile (and thus has an unreliable reference location). For some signal sources, numerous observations may be needed before a crowd-sourced mobility status of the signal source will be reliable. A newly-observed signal source may have limited crowd-sourced information from which the mobility status of the signal source can be determined. If there have insufficient observations of a signal source to determine the mobility status of the signal source reliably, then a mobile signal source may be used as if the mobile signal source was stationary, which may add unacceptable error to a determined position estimate using the signal(s) from the mobile signal source.

SUMMARY

An example apparatus includes: an interface comprising a receiver, or a transmitter, or a combination thereof; a memory; and a processor communicatively coupled to the memory and the interface and configured to: obtain at least one identifier that is associated with one or more devices including a signal source that is configured to transmit wireless signals and whose mobility status is unknown to the apparatus; and determine, based on the at least one identifier, whether an expected mobility status of the signal source is mobile or stationary.

An example signal source mobility status method includes: obtaining, at an apparatus, at least one identifier that is associated with one or more devices including a signal source that is configured to transmit wireless signals and whose mobility status is unknown to the apparatus; and determining, at the apparatus based on the at least one identifier, whether an expected mobility status of the signal source is mobile or stationary.

Another example apparatus includes: means for obtaining at least one identifier that is associated with one or more devices including a signal source that is configured to transmit wireless signals and whose mobility status is unknown to the apparatus; and means for determining, based on the at least one identifier, whether an expected mobility status of the signal source is mobile or stationary.

An example non-transitory, processor-readable storage medium includes processor-readable instructions to cause a processor to: obtain at least one identifier that is associated with one or more devices including a signal source that is configured to transmit wireless signals and whose mobility status is unknown to the apparatus; and determine, based on the at least one identifier, whether an expected mobility status of the signal source is mobile or stationary.

BRIEF DESCRIPTION OF THE DRAWINGS

FIG. 8 is an example of a mobility relationship message providing information relating one or more identifiers and corresponding information indicative of mobility status of one or more corresponding signal sources.

FIG. 9 is another example of a mobility relationship message.

FIG. 10 is another example of a mobility relationship message.

FIG. 12 is another example of a mobility relationship message.

FIG. 13 is another example of a mobility relationship message.

FIG. 14 is another example of a mobility relationship table.

FIG. 16 is a block flow diagram of a signal source mobility status method.

FIG. 17 is a block diagram of a stage that may be added to the block flow diagram shown in FIG. 16.

DETAILED DESCRIPTION

Figure 1:
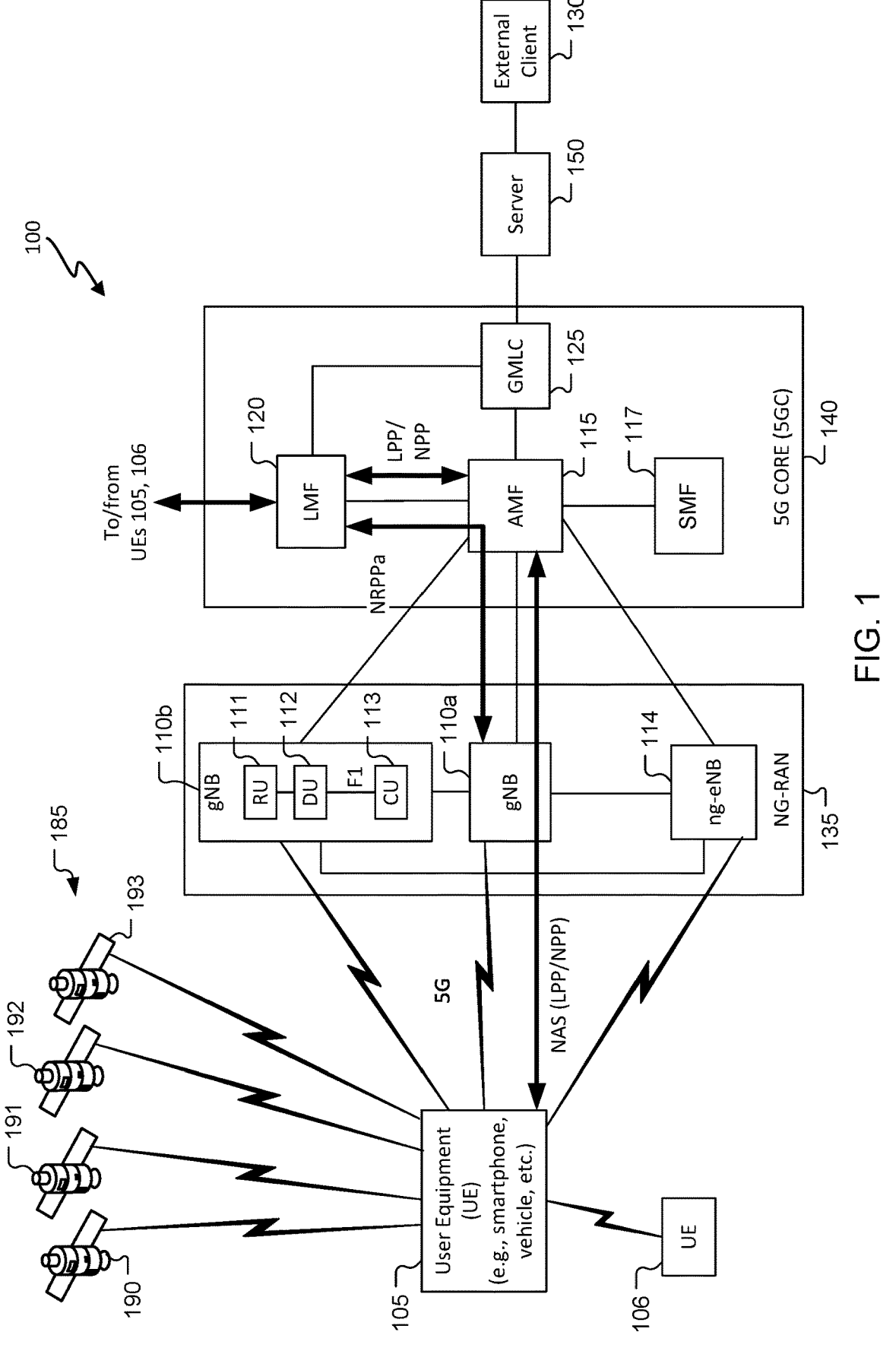
FIG. 1 is a simplified diagram of an example wireless communications system.

Techniques are discussed herein for determining an expected mobility status of a source of wireless signals that can be used to determine a position estimate of a mobile device. For example, mobility of a device may be classified based on a MAC address, and this can inform whether to use the device for WiFi AP positioning. As another example, one or more identifiers of a newly-observed signal source (e.g., an access point) may be used to predict a mobility status of the signal source, e.g., whether the newly-observed signal source is mobile or stationary. The prediction may come with a certainty level or probability of being correct. Based on the prediction of mobility status, one or more signals from the signal source may or may not be used to determine the position estimate of the mobile device. Even if one or more signals from the signal source are used to determine the position estimate of the mobile device, the position estimate may not be for reporting a determined location of one or more signal sources used to determine the position estimate. A position estimate with high confidence, e.g., that is based on few, if any, mobile signal sources or for which the use of the mobile signal source(s) had little effect on the determined position estimate, may be used to update location, and possibly in turn mobility status, of one or more of the signal sources observed by the mobile device and corresponding to the determined position estimate. Other techniques, however, may be used.

Items and/or techniques described herein may provide one or more of the following capabilities, as well as other capabilities not mentioned. Position estimate confidence for a mobile device may be improved. Reliability of crowd-sourced mobility status of sources of signals for determining position estimates may be improved. Use of low-confidence position estimates may be limited to uses not requiring high-confidence position estimates. Use of low-confidence position estimates for purposes needing high-confidence position estimates may be avoided. Spectral efficiency may be improved (e.g., with less data being transmitted and/or received). Power consumption may be reduced (e.g., due to less data being transmitted and/or received, and/or due to less searching for signals and/or less signal measurement for position estimation). Lower latency for positioning may be achieved, e.g., due to fewer signal sources (e.g., access points) to identify and being used to determine a position estimate. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
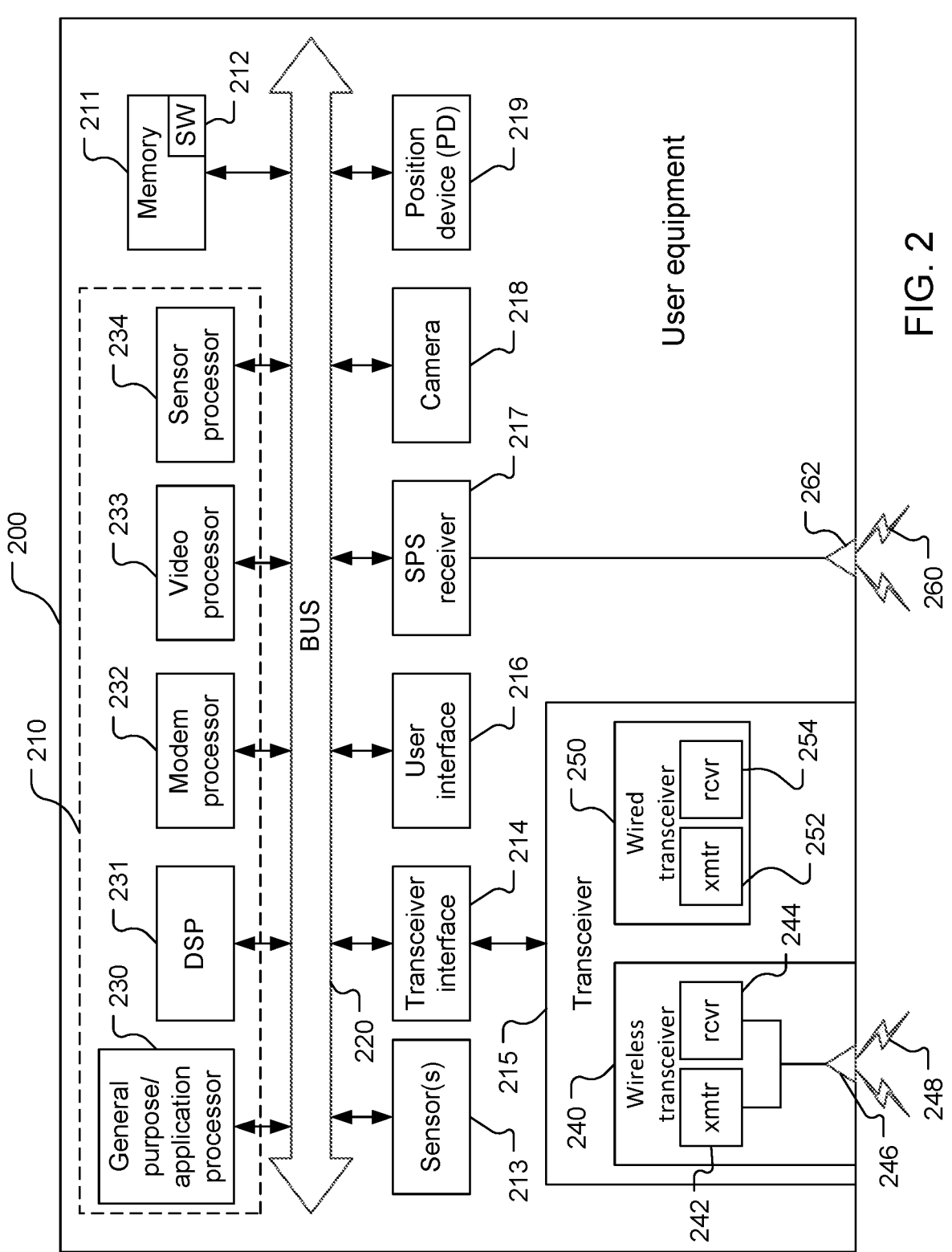
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor

210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be unconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/

IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6

GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
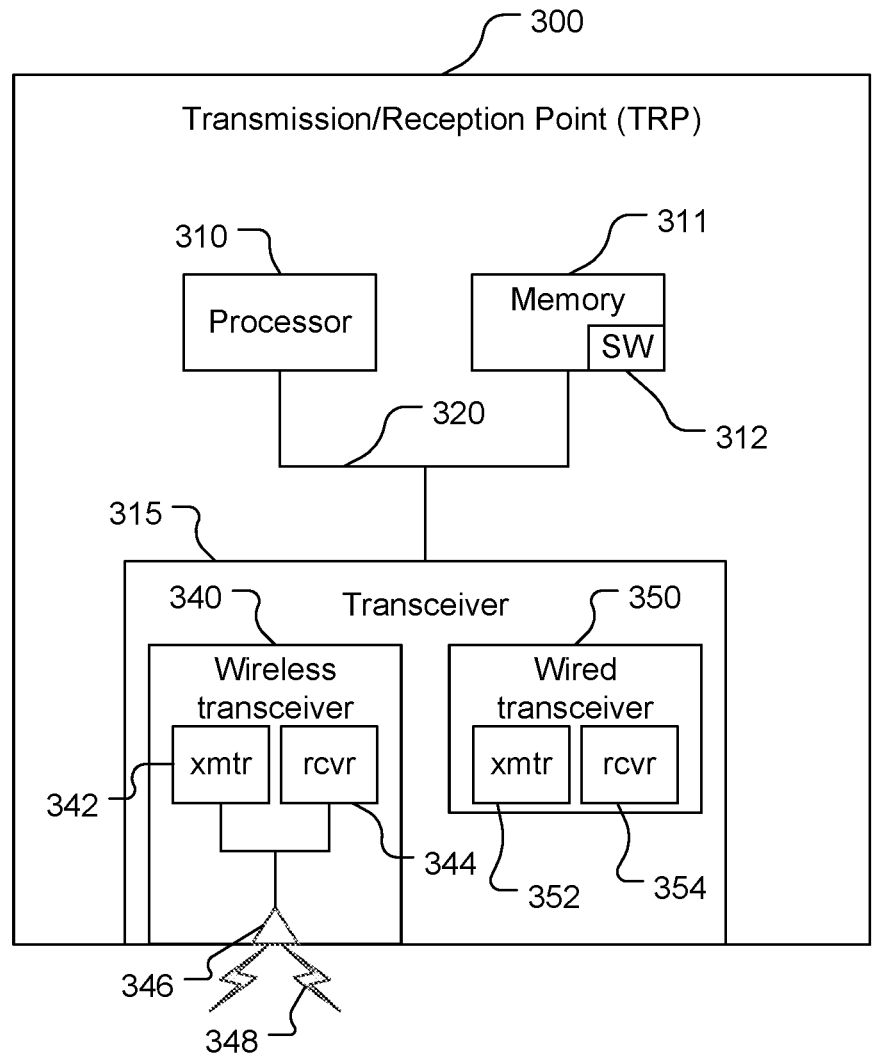
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
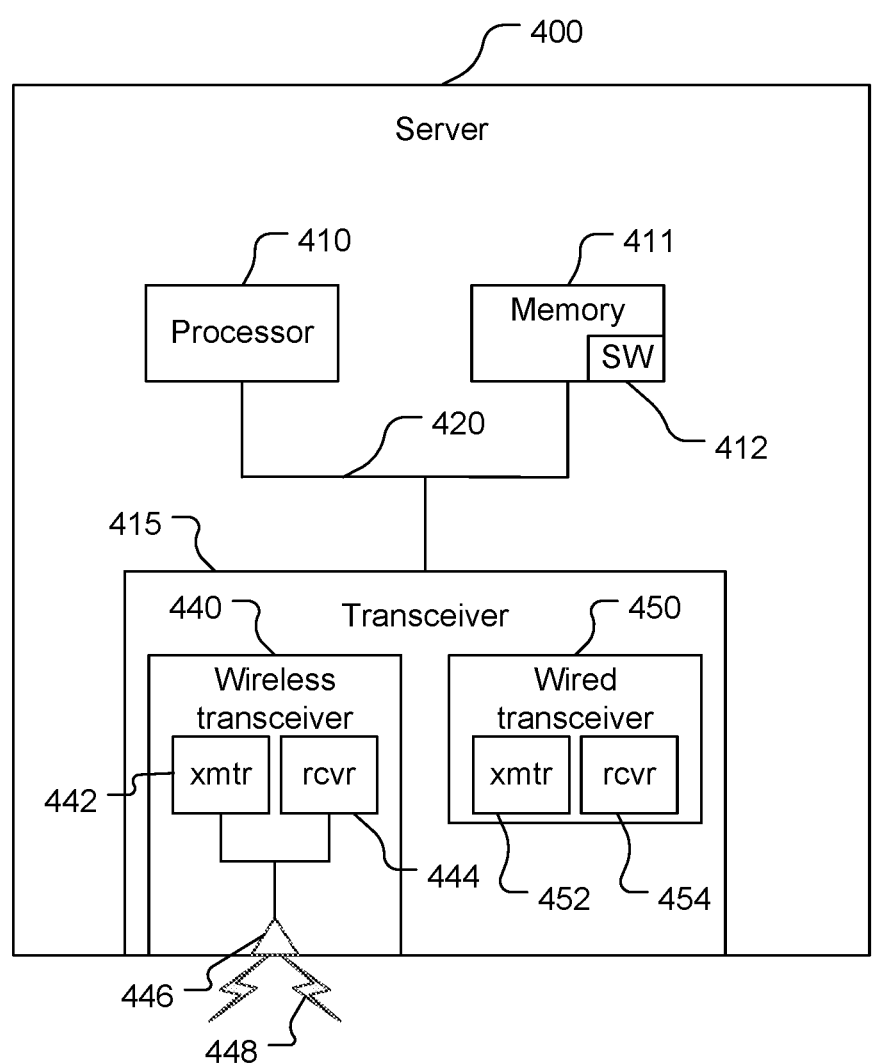
FIG. 4 is a block diagram of components of a server, various examples of which are shown in FIG. 1.

Referring also to FIG. 4, a server 400, of which the LMF 120 is an example, comprises a computing platform including a processor 410, memory 411 including software (SW) 412, and an interface 415. The processor 410, the memory 411, and the interface 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The interface 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/ integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS- ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Signal Source Class Prediction, Determination, and Use

Figure 5:
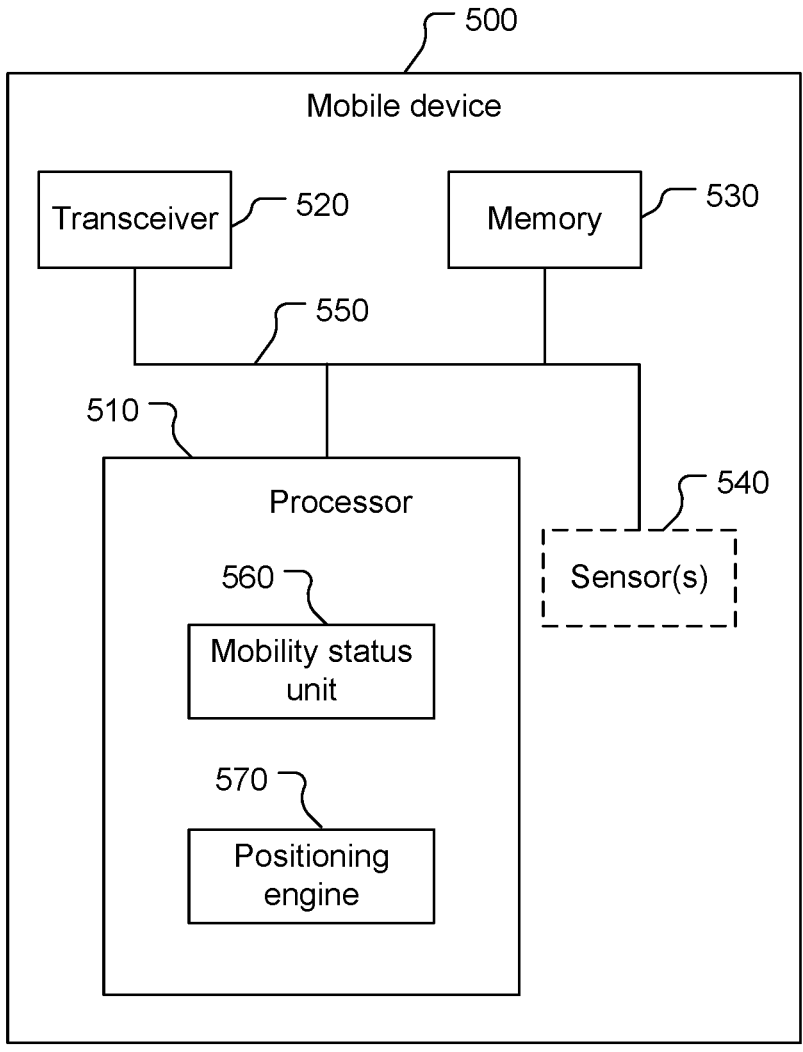
FIG. 5 is a block diagram of an example mobile device.

Referring to FIG. 5, a mobile device 500 includes a processor 510, an interface 520, a memory 530, and, optionally, one or more sensors 540, communicatively coupled to each other by a bus 550. The device 500 may take any of a variety of forms such as a mobile device such as a smartphone, a vehicle user equipment (VUE), etc. The device 500 may include the components shown in FIG. 5, and may include one or more other components such as any of those shown in FIG. 2 such that the UE 200 may be an example of the device 500. For example, the processor 510 may include one or more of the components of the processor 210. The interface 520 may include a receiver and may include a transmitter, e.g., may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the device 500 performing a function as shorthand for one or more appropriate components (e.g., the processor 510 and the memory 530) of the device 500 performing the function. The processor 510 (possibly in conjunction with the memory 530 and, as appropriate, the interface 520) may include a mobility status unit 560 and a positioning engine 570. The mobility status unit 560 and the positioning engine are discussed further below, and the description may refer to the processor 510 generally, or the device 500 generally, as performing any of the functions of the mobility status unit 560 and/or the positioning engine 560, with the device 500 being configured to perform the functions.

Figure 6:
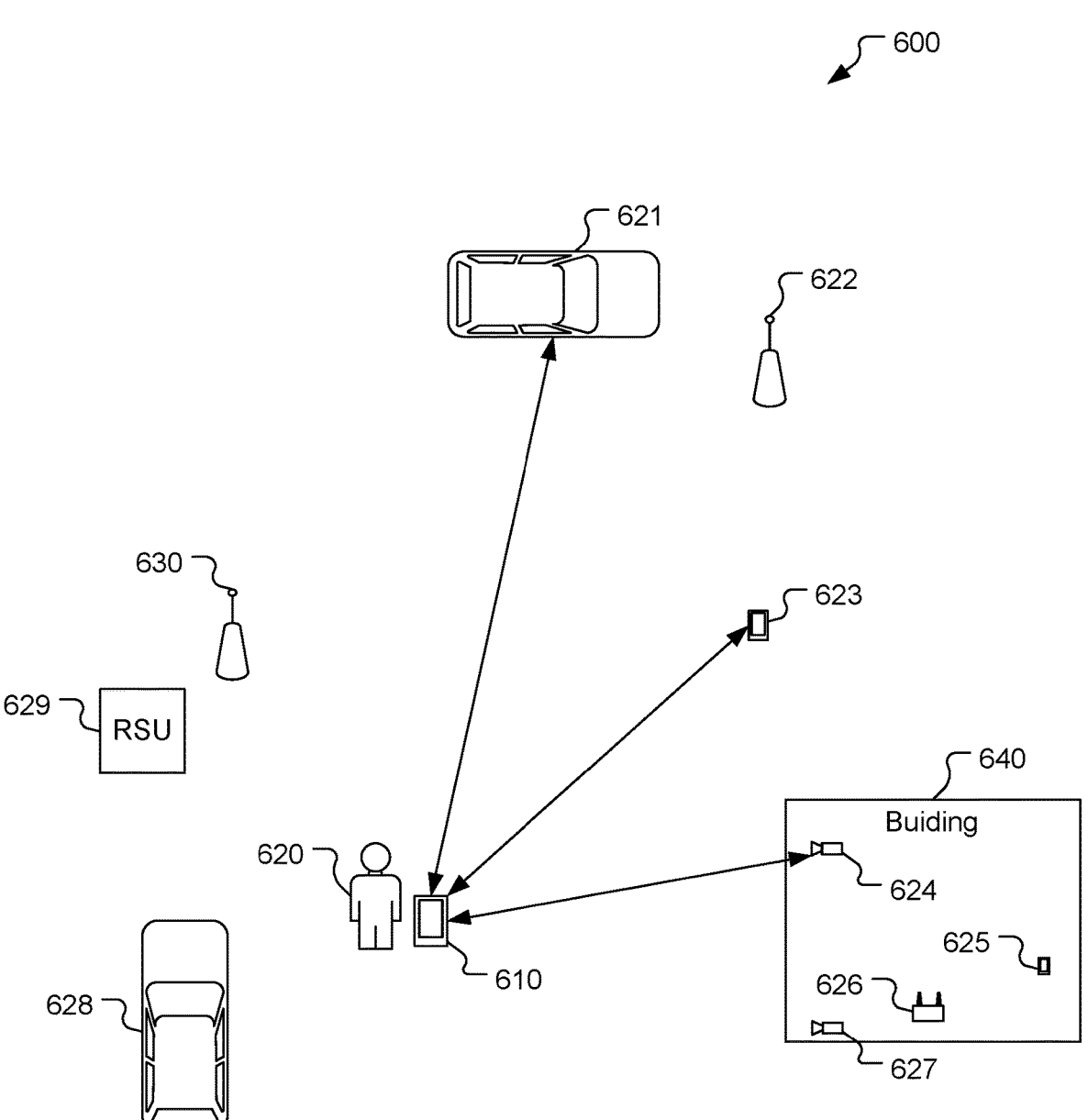
FIG. 6 is a diagram of an example positioning environment.

Referring also to FIG. 6, a positioning environment 600 includes a mobile device 610 and wireless communication devices 621, 622, 623, 624, 625, 626, 627, 628, 629, 630. The mobile device 600 may be an example of the mobile device 500. The wireless communication devices 621-630 may be configured to provide signals that may be measured by the mobile device 610 for determining a position estimate of the mobile device 610. For example, PRS or other signals (e.g., communication signals) may be transmitted wirelessly and measured by the mobile device 610 to determine one or more positioning measurements (measurements that may be used to determine a position estimate of the mobile device 610), e.g., time of arrival, received signal strength (e.g., RSSI), etc. Any of the wireless communication devices 621-630 may or may not be configured for bi-directional communication. In this example, the wireless communication devices 621, 628 are vehicles, or portions thereof, the wireless communication devices 623, 625 are smartphones or tablet computers, the wireless communication devices 624, 627 are portions of security cameras, the wireless communication devices 622, 626, 630 are typically-stationary access points, and the wireless communication device 629 is an RSU (Roadside Unit). The RSU 612 may be configured similarly to the TRP 300, although perhaps having less functionality and/or shorter range than a base-station-based TRP. The mobile device 610 may communicate with any of the wireless communication devices 621-630 although communications are indicated only between the mobile device 610 and the wireless communication devices 621, 623, 624 for sake of clarity of the figure. The mobile device 610, e.g., the positioning engine 570, may be configured to determine a position estimate for the mobile device 610 based on signals received from and/or transmitted to the wireless communication devices 621-630.

The environment 600 may change, e.g., with devices entering and/or exiting the environment 600. Devices may be added to the environment 600 that have not been seen previously. The mobile device 610 and/or another device (e.g., a server that may receive measurements from the mobile device 610) may determine a mobility status of a newly-observed wireless communication device, which may help determine whether and/or how to use positioning measurements from the newly-observed wireless communication device.

Figure 7:
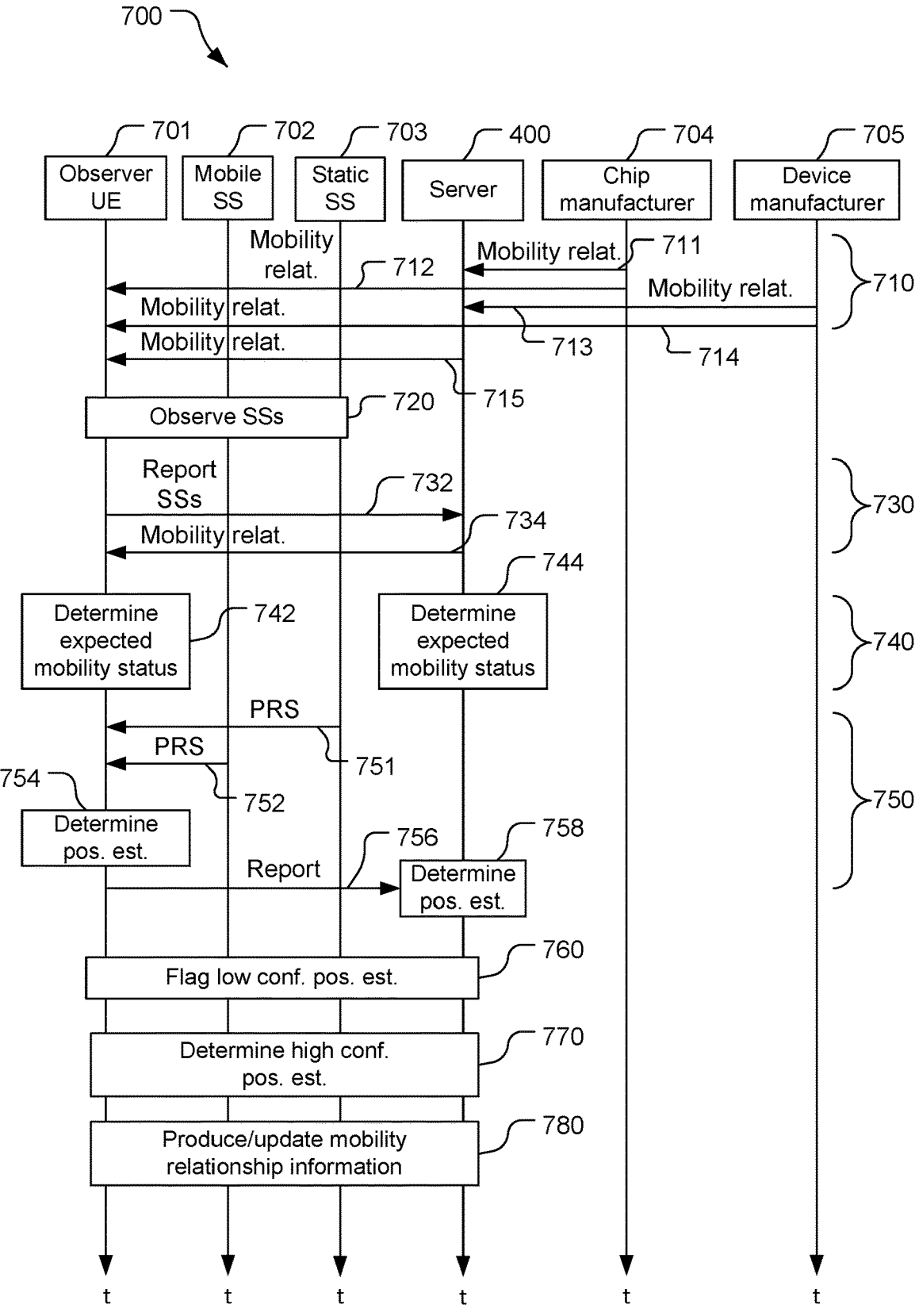
FIG. 7 is a timing diagram of a signaling and process flow for measuring signals from a newly-observed signal source, determining a position estimate, and updating one or more mobility status relationships.

Referring to FIG. 7, with further reference to FIGS. 3-6, a signaling and process flow 700 for measuring signals from a newly-observed signal source, determining a position estimate, and updating one or more mobility status relationships includes the stages shown. The flow 700 involves actions by and/or signal transfer between an observer UE 701 (e.g., the mobile device 600), a mobile signal source 702 (mobile SS, e.g., a mobile access point), a stationary signal source 703 (e.g., a stationary access point), the server 400, a chip manufacturer 704 (e.g., a server of a chip manufacturer), and a device manufacturer 705 (e.g., a server of a device manufacturer). Other flows are possible, e.g., with one or more stages shown omitted, one or more stages added, and/or one or more stages shown altered. For example, stage 710 may be performed after stage 720, e.g., in response to a request. As another example, at least part of stage 710 may be performed before stage 720 and at least part of stage 710 performed after stage 720. Still other alterations of the flow 700 may be implemented.

At stage 710, mobility relationship information is obtained by the observer UE 701 and/or by the server 400. Mobility relationship information may be provided by the chip manufacturer 704 in one or more of mobility relationship messages 711, 712 and/or may be provided by the device manufacturer 705 in one or more mobility relationship messages 713, 714. The mobility relationship information may provide indications of products capable of providing signals for use in determining a position estimate of the observer UE 701 and corresponding information as to the mobility status of the products, and thus the relationship between product and mobility status. For example, one or more of the messages 711, 712 may comprise information from a component supplier database indicating (e.g., to a WiFi database) a pattern of component identities and mobility status, e.g., a pattern of component identities corresponding to mobile products. As another example, one or more of the messages 713, 714 may comprise information from a device supplier database indicating (e.g., to a WiFi database) a pattern of device identities and mobility status, e.g., a pattern of device identities corresponding to mobile products.

Referring also to FIGS. 8-10, mobility information may include explicit and/or implicit indications that a product should be considered (or at least assumed) to be mobile absent contradictory information, or that a product should be considered (or at least assumed) to be stationary absent contradictory information. For example, messages 800, 900, 1000, each of which may be an example of the mobility relationship message 711, may include an identifier field 810, a device type field 820, a mobility field 830, a purchaser field 840, and a maker field 850. The identifier field 810 may include one or more indications of one or more identifier types, e.g., network identifier(s) (e.g., SSID(s) (Secure Set Identifier(s) for WiFi) and/or device identifier(s) (e.g., MAC address(es), EUI(s) (Extended Unique Identifier(s)), etc.).

The device type field 820 may indicate a type of device corresponding to the identifier(s) and/or a type of device into which the device(s) corresponding to the identifier(s) will be incorporated. The mobility field 830 may include an explicit indication of a mobility status, e.g., a likely mobility status or a default mobility status, of the device(s) corresponding to the identifier(s), e.g., whether the device(s) is(are) mobile or stationary. For example, the mobility field 830 in the message 800 explicitly indicates that the corresponding device(s) is(are) mobile and the mobility field 830 in the message 900 explicitly indicates that the corresponding device(s) is(are). The purchaser field 840 may indicate a buyer of the device(s) indicated by the identifier(s). The maker field 850 may indicate a manufacturer of the device(s) indicated by the identifier(s) (e.g., an entity that makes the device(s) and/or an entity that does not make the device(s) but is responsible for the device(s) being made). The device type field 820, the purchaser field 840, and/or the maker field 850 may provide one or more implicit indications of the mobility status of the device(s) corresponding to the identifier(s). For example, in the message 1000, the device type of router, the purchaser of BestBuy®, and the maker of Linksys®, implicitly indicate that the device(s) is(are) router(s) that while easily moved, will typically not be moved frequently once installed and set up, and thus may imply that the device(s) is(are) stationary. As another example, a maker of Qualcomm® may not alone imply one mobility status, and thus other information (instead of or in addition to the maker) may be used to determine the mobility status. The identifier field 810 may also imply the mobility status of the device(s) corresponding to the identifier(s). For example, in the message 800, the network identifiers in the range FordExplorerXX, i.e., FordExplorer00-FordExplorer99, may imply, because Ford® is a vehicle manufacturer, that the device(s) will be mobile.

The mobility relationship messages 713, 714 may convey mobility information similar to the mobility relationship messages 711, 712. For example, the mobility relationship messages 713, 714 may be similar to any of the messages 800, 900, 1000, but with the maker field 850 filled, if at all, with an indication of a device maker. For example, a maker may be a cell phone maker and the purchaser may be a cell phone service provider. In this case, the mobility field 830 may explicitly indicate a mobility status of mobile and/or the purchaser field 840 and/or one or more other fields may implicitly indicate that the device(s) corresponding to the identifier(s) is(are) mobile.

Mobility relationship information may be provided to the observer UE 701 from the server 400 in a mobility relationship message 715. For example, the mobility relationship message 715 may include one or both of the mobility relationship messages 712, 714. As another example, the mobility relationship message 715 may include an accumulation of information from the mobility relationship messages 711, 713, and/or mobility relationship information determined by the server 400, e.g., from observation (e.g., as discussed with respect to at least stage 780 discussed below). The server 400 may filter out indications of mobile devices and provide indications of stationary devices, e.g., as in the message 900. For example, the indicated stationary devices may be approved devices for use in positioning such that the observer UE 701 will not use other devices (that are not indicated in the message 715 and that may be mobile) for positioning (e.g., determining a position estimate for the observer UE 701 and/or providing information for determining such a position estimate).

Figure 11:
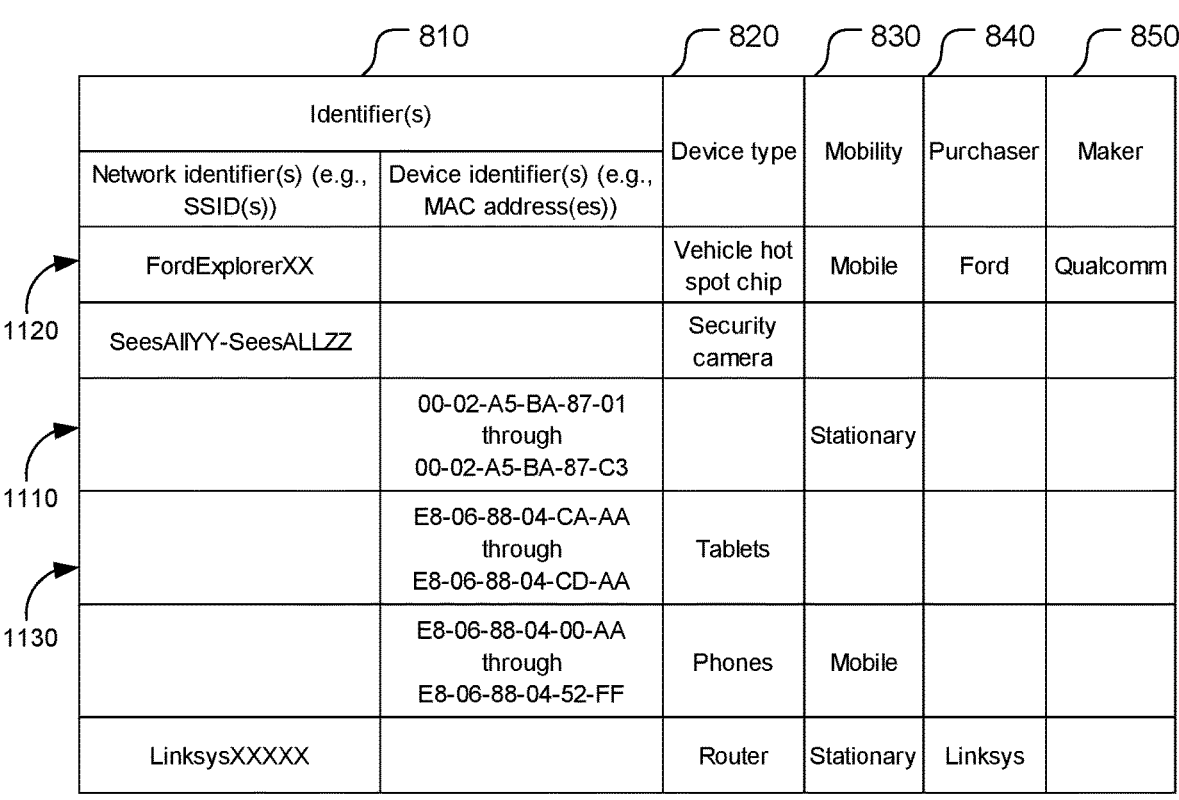
FIG. 11 is an example of a mobility relationship table.

Mobility relationship information may be accumulated by the observer UE 701 and/or the server 400. For example, referring also to FIG. 11, a table 1100 of mobility relationship information may include multiple entries each with respective information for the field 810, and for one or more of the fields 820, 830, 840, 850. The table 1100 may be produced by the observer UE 701, e.g., the mobility status unit 560, and/or by the server 400, e.g., by the processor 410. The table 1100 may, for example, include mobility relationship information for signal sources in a vicinity of the observer UE 701 and provided to the observer UE 701 by the server 400 based on a coarse location of the observer UE 701 (e.g., based on E-CID). The table 1100 may have one or more patterns corresponding to respective mobility status. For example, a range of identifiers may be associated with mobile devices or stationary devices. As another example, a portion of an identifier (e.g., indicative of a manufacturer or user) may correspond to a particular mobility status. For example, a core portion of an identifier that is a particular manufacturer name (e.g., "BMW®" or "Ford®") or a particular user name (e.g., "ADT®") may correspond to a mobility status of "mobile" or a mobility status of "stationary".

At stage 720, the observer UE 701 may observe signal sources including the mobile signal source 702 and the stationary signal source 703 and may report observed signal sources. The observer UE 701 may receive one or more signals (e.g., PRS and/or communication signal(s)) from each of the signal sources 702, 703, along with one or more other signal sources. One or more of the signal sources, including either or both of the signal sources 702, 703, may be newly observed, with the observer UE 701 having no observed information (e.g., signal measurements and corresponding locations) indicating whether the mobility status of the newly-observed signal source(s) is(are) mobile or stationary (i.e., not moving/mobile).

At stage 730, the observer UE 701 may report the signal sources (SSs) that the observer UE 701 sees and the server 400 may, in response, provide mobility relationship information. The observer UE 701 may send a signal source report 732 indicating observed signal sources, and may indicate which of the observed SSs is newly-observed to the observer UE 701. The indication of the newly-observed SS(s) may be an implicit request for mobility relationship information for the newly-observed SS(s). Also or alternatively, the observer UE 701 may send an explicit request for mobility relationship information for the newly-observed SS(s). The explicit and/or implicit request may include one or more identifiers, e.g., one or more network identifiers and/or one or more device identifiers for each of the newly-observed signal sources. The network identifier(s) and/or the device identifier(s) may be signaling technology specific (e.g., for WiFi (e.g., an SSID), or Bluetooth®, etc.), and the observer UE 701 may be able to use the mobility status information provided for a signal source based on one signaling technology (e.g., that the observer UE 701 does not use to determine positioning measurements) and apply that mobility status to the signal source for a different technology (e.g., that the observer UE 701 uses to determine positioning measurements).

The server 400 may respond to the signal source report 732 by sending a mobility relationship message 734. The mobility relationship message 734 may provide mobility relationship information (e.g., mobility status indication(s)) for one or more of the signal sources indicated in the signal source report 732, e.g., one or more signal sources indicated in the signal source report 732 to be newly observed and/or that the server 400 determines to be newly observed. The mobility relationship message 734 may provide mobility relationship information that the observer UE 701 may be able to use to determine a mobility status of one or more observed signal sources.

At stage 740, the observer UE 701 and/or the server 400 may determine expected mobility status of one or more signal sources. For example, the mobility status unit 560 and/or the processor 410 may use prior knowledge (e.g., from either or both of the manufacturers 704, 705, and/or from one or more other entities, and/or from one or more observations) about the mobility status of signal sources to determine the expected mobility status of the observed signal source(s). For example, patterns in identifiers (e.g., SSIDs, MAC addresses, EUIs, etc.) corresponding to signal sources may be used to predict if a signal source without observed information is mobile or stationary, possibly along with a certainty level in the mobile/stationary assessment. At sub-stage 742, the mobility status unit 560 may analyze identifier information for one or more of (e.g., each of) the observed signal sources to determine the expected mobility status. The mobility status unit 560 may compare one or more identifiers for an observed signal source with the collected mobility relationship information, e.g., one or more patterns in identifier(s) and corresponding mobility status (explicit or implicit) to determine the expected mobility status of the observed signal source (e.g., mobile, stationary, likely mobile, likely stationary, mobile with a percent certainty level, stationary with a percent certainty level, a continuum from confident mobile to confident stationary, etc.). For example, the mobility status unit 560 may compare a MAC address of an observed signal source with the table 1100, find that the MAC address is within the range of device identifiers indicated in the identifier field 810 for an entry 1110, and conclude that the observed signal source is stationary. Similarly, the mobility status unit 560 may compare an SSID of an observed signal source with the table 1100, find that the SSID is within the range of network identifiers indicated in the identifier field 810 for an entry 1120, and conclude that the observed signal source is mobile. As another example, the mobility status unit 560 may apply an identifier, or a portion thereof, to a model such as an artificial intelligence model to determine a corresponding expected mobility status. The model may return a corresponding expected mobility status (e.g., if the mobility status can be determined with at least a threshold level of confidence) or return an indication that the expected mobility status is indeterminate. At sub-stage 744, the server 400 (e.g., the processor 410, possibly in combination with the memory 411) may determine expected mobility status similarly to the mobility status unit 560 at sub-stage 742. Either of the sub-stages 742, 744 may be omitted from the flow 700.

The expected mobility status may be called a predicted mobility status if the expectation is based on non-observed information (e.g., allocated identifiers, device types, purchaser, and/or maker, etc.). Predicted mobility status may be used when there is no observed history for a signal source to affect how measurements gathered from signals from that signal source are used. For example, measurements from a mobile signal source may be de-weighted or ignored in determining a position estimate for the observer UE 701, at least for a position estimate that is required to have high precision and/or high confidence. In this way, poor and/or unreliable position estimates may be avoided, and thus consequences improperly based on such position estimates avoided (e.g., using self-driving functionality in a region where such functionality is not allowed, because the unreliable position estimate indicates that the vehicle is in a region where self-driving is allowed). As another example, low-precision and/or low-confidence position estimates may be obtained based on one or more mobile signal sources where such position estimates are acceptable (e.g., determining a country in which the observer UE 701 is disposed). Thus, instead of not returning a position estimate which may prevent a corresponding action (e.g., allowing a phone call), a position estimate may be provided, possibly along with an indication that the position estimate is of low precision and/or of low confidence (e.g., that there is low confidence that the position estimate is accurate, e.g., within a threshold accuracy such as a threshold radius).

The expected mobility status may be based, at least partially, on observed information, e.g., one or more received signals indicating one or more identifiers of the observed signal source, and a time and location of the observation. As discussed further below, mobility relationship information may be developed through observations, e.g., producing mobility relationship information for devices for which no such information was available, and/or updating/revising previous mobility relationship information for devices (e.g., supplied by one or more entities and/or developed through observation).

The expected mobility status may be determined based on information in addition to identifier information, including information in addition to or instead of device type, purchaser, and/or maker as discussed above. For example, the mobility status unit 560 and/or the server 400 may evaluate a geographic area when determining mobility status. For example, for a particular network identifier, and device identifiers within a particular range, the mobility status may be stationary for one geographic region but be mobile or indeterminate for another geographic region. As another example of mobility status as a function of a combination of information, a purchaser may produce mobile signal sources and stationary signal sources, and a manufacturer may make signal sources for mobile devices and for stationary devices, buy may sell only signal sources for mobile devices to the purchaser. Thus, this manufacturer in combination with this purchaser may narrow the mobility status, in this example to mobile.

At stage 750, one or more position estimates for the observer UE 701 may be determined. The observer UE 701 may receive positioning signals (signals from which a position estimate may be determined, e.g., signals that can be measured to determine a range between the observer UE 701 and the signal source), e.g., PRS 751 from the stationary SS 703 and PRS 752 from the mobile SS 702. At sub-stage 754, the observer UE 701, e.g., the positioning engine 570, measures the positioning signals, e.g., the PRS 751, 752, to determine ranges to the signal sources, and uses locations of the signal sources to determine the position estimate for the observer UE 701. The position estimate may be based on one or more signals from one or more mobile signal sources, which may affect the reliability and/or accuracy of the position estimate. The observer UE 701 may send a report 756 to the server 400. The report 756 may include position information such as one or more positioning signal measurements, one or more ranges (and corresponding signal source(s) and/or location(s) of transmission of the positioning signal(s)), and/or one or more position estimates for the observer UE 701. At sub-stage 758, the server 400 (e.g., the processor 410 possibly in combination with the memory

411) may determine one or more position estimates for the observer UE 701 using the position information in the report 756.

At stage 760, a position estimate may be determined to be of low confidence and flagged as such. For example, the positioning engine 570 of the observer UE 701 and/or the processor 410 of the server 400 may determine a position estimate, if possible, based only on positioning signals from observed signal sources whose mobility statuses are stationary and determine one or more position estimates based on positioning signals from signal sources including at least one signal source whose expected mobility status is mobile (which may include a certainty level of the mobility status). If a position estimate is only achievable by using one or more positioning signals from signal source(s) with mobility status of mobile (with mobility status confidence of more than a threshold confidence, e.g., 60%), or if a position estimate based on at least one mobile signal source is significantly different from (e.g., more than a threshold distance from) a position estimate based only on stationary signal sources, then a position estimate based on one or more mobile signal sources may be flagged as being of low confidence. Other techniques for determining low-confidence position estimates may be used. For example, a position estimate may be determined using all signal sources, and one or more position estimates determined without the use of one or more mobile signals sources (e.g., signal sources with expected mobility status being "mobile" with at least a threshold confidence level in the accuracy of the expected mobile status). The different position estimates may be compared to determine whether any particular position estimate is a low-confidence position estimate (e.g., due to being more than a threshold distance away from another one of the position estimates, e.g., the position estimate based only on stationary signal sources (e.g., signal sources with expected mobility status being "stationary" with at least a threshold confidence level in the accuracy of the expected mobile status)).

At stage 770, a position estimate may be determined to be a high-confidence position estimate. For example, a position estimate based on one or more mobile signal sources may be labeled as high confidence if the position estimate is within a threshold (e.g., distance) of a position estimate based only on stationary signal sources.

Experiments have shown that low-confidence labels, and high-confidence labels, determined according to techniques discussed herein are reliable. For example, experiments showed that more than 90% of position estimates flagged as low confidence were more than 1 km away from the true location of the observer UE 701, and 50% were more than 12 km away from the true location. Further, experiments showed that a majority of signal sources with expected mobile status of mobile were observed more than 1 km away from a calculated position of the signal source at least once. Further, experiments showed that position estimates labeled as high confidence (e.g., due to being within a threshold distance of a position estimate based on stationary signal sources only) were almost always an improvement over the position estimate based only on stationary signal sources.

A location application may limit the use of a low-confidence position estimate. For example, a location application may not report a low-confidence position estimate to a location requester. As another example, a location application may report a low-confidence position estimate to the location requester but with a disclaimer as to the low confidence in the position estimate (e.g., an indication that a high-confidence position estimate was unachievable). As another example, a location application may only report a low-confidence position estimate based on a location requester indicating (implicitly or explicitly) that a low-confidence position estimate is acceptable.

At stage 780, mobility relationship information may be produced. The observer UE 701 (e.g., the mobility status unit 560) and/or the server 400 (e.g., the processor 410) may produce mobility relationship information for a device without prior mobility relationship information (at least, such information known to the observer UE 701 and/or the server 400). For example, a high-confidence position estimate may be stored in association with information (e.g., network identifier, device identifier, etc.) associated with a signal source. A location for the signal source may be provided and stored, e.g., based on the determined location for the observer UE and a distance between the observer UE 701 and the signal source (e.g., based on one or more measurements, e.g., received signal strength, round-trip time, etc.). A mobility status may or may not be associated with the signal source absent further observations and corresponding high-confidence position estimates. Also or alternatively, the observer UE 701 and/or the server 400 may update mobility relationship information. For example, one or more high-confidence position estimates corresponding to observation(s) of a signal source may be stored as part of mobility relationship information and/or may be used to determine an expected mobility status of the corresponding signal source.

The mobility relationship information may be used to form one or more models (e.g., an algorithm) for determining expected mobility status (i.e., an expected mobility status model). For example, a model may be able to determine an expected mobility status based on one or more identifiers. For example, a model may be able to determine an expected mobility status based on a network identifier (e.g., SSID). As another example, a model may be able to determine an expected mobility status based on a device identifier (e.g., a MAC address). As another example, a model may be able to determine an expected mobility status based on a combination of network identifier and device identifier. Still other example implementations of expected mobility status models may be used. An expected mobility status model may, for example, be a machine learning model (e.g., a neural network) for determining expected mobility status from one or more identifier(s). As another example, mobility status model may comprise a database of mobility relationship information, e.g., such as the table 1100, including one or more identifiers (e.g., network identifier(s) and/or device identifier(s)) and information indicative of mobility status (e.g., explicit mobility status indication(s) and/or implicit mobility status indication(s)).

Referring also to FIGS. 12 and 13, determined mobility relationship information may include one or more mobility status conclusions and/or information from which mobility status may be determined. For example, the observer UE 701 may send a mobility relationship message 1200 to the server 400 indicating one or more identifiers of a signal source and a mobility status of the signal source. Alternatively, the observer UE 701 may determine content of the message 1200 but not send the message 1200, e.g., storing content of the message 1200 and/or using the content to update mobility relationship information (e.g., as discussed below). The observer UE 701 may determine the mobility status by one or more observations of the signal source. For example, the observer UE 701 may conclude that the signal source is mobile based on determining a high-confidence location for the observer UE 701 and a corresponding location for the signal source that is significantly different from a stored location for the signal source. As another example, the observer UE 701 may conclude that the signal source is stationary based on determining multiple high-confidence locations for the observer UE 701 for multiple corresponding times and corresponding locations for the signal source that do not significantly change of the multiple times. As another example, the observer UE 701 may send information to the server 400 upon which mobility relationship information may be determined. For example, the observer UE 701 may send a signal source information message 1300 including information in an identifier field 1310, a location field 1320, and a time field 1330. The location field 1320 may include a location (e.g., latitude and longitude) for the signal source corresponding to a high-confidence location determined for the observer UE 701, and a time corresponding to when the signal source was at the indicated location. A single such message may be used to conclude that the mobility status of the signal source is mobile if the indicated location (which is reliable) is significantly different from a previously-determined location for the signal source, with the mobility status being changed from stationary to mobile as appropriate. Multiple messages 1300 indicating a similar location (e.g., within a threshold distance of a location) over time (e.g., for at least a threshold amount of time and/or a threshold quantity of samples) may be used to determine to conclude that a mobility status of the signal source is stationary, changing the mobility status as appropriate. Patterns of expected mobility status may be identified and mobility relationship information produced accordingly. For example, patterns of identifiers (e.g., a recurring portion of identifiers, be they network identifiers and/or device identifier) may be determined to be associated with a particular mobility status and thus an expected mobility status for this pattern of identifiers may be established.

Referring also to FIG. 14, determined mobility status may be used to update stored mobility relationship information. For example, determined mobility status information may be used to change a stored expected mobility status such as a stored mobility status type (from mobile to stationary or from stationary to mobile) of a signal source, or to change a confidence level for the same mobility status type for a signal source. Mobility status information may be updated based on a pattern of mobility status being identified by observed data or a combination of observed and provided data (e.g., from a manufacturer or other entity). Updating the mobility relationship information may, for example, remove one or more identifiers from being associated with a particular mobility status or change the mobility status associated with one or more identifiers. As another example, updating the mobility relationship information may add one or more identifiers and corresponding mobility status to stored mobility relationship information. For example, a table 1400 is similar to the table 1100, but updated based on the information in the messages 1200, 1300. An entry 1401 is similar to the entry 1110, but the range of MAC addresses indicated does not include the MAC address now in an entry 1403 that has been determined to be associated with a mobile signal source. Similarly, an entry 1402 is similar to an entry 1130, but has been modified to remove a MAC address indicated in the message 1300. In this example, further observations of the signal source identified in the message 1300 have been made over time such that the signal source has been determined (e.g., by the observer UE 701 and/or the server 400) to be stationary, as indicated in an entry 1404. The table 1400 represents updated information, in this example, mobility relationship information provided by one or more manufacturers and mobility relationship information determined through observation (with observations possibly being made by different entities, e.g., different observer UEs). The table 1400 may be used by the server 400 and/or the observer UE 701 to determine expected mobility status of signal sources and/or to determine whether a determined position estimate for the observer UE 701 is of low confidence, such that one or more appropriate responses may be taken accordingly. In this way, signal sources that change mobility status may be accounted for, e.g., increasing confidence in a position estimates determined using a stationary signal source (even if that signal source was previously mobile or expected to be mobile). As another example, position estimates determined using signal sources that have expected mobility status of mobile may be ignored, de-weighted, and/or flagged as being of low confidence, which may help avoid using poor quality position estimates for decisions (e.g., using self-driving functionality in a region where such functionality is not allowed). The updated mobility relationship information may be used in future position estimate determinations.

Figure 15:
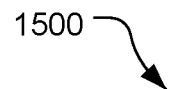
FIG. 15 is an example of a filtered table indicative of stationary devices.

Referring also to FIG. 15, determined mobility status may be used to send assistance data to the observer UE 701 and/or to one or more other devices. A table 1500 may be sent by the server 400 to the observer UE 701 with information regarding devices (e.g., UEs, APs, etc.) determined, indicated, or presumed to be mobile filtered out such that only devices (e.g., UEs, APs, etc.) that are expected, indicated (e.g., by another server or other device), or determined to be stationary are indicated to the observer UE 701 (e.g., in this example, the table 1500 is the table 1400 with mobile device information filtered out). In this way, the observer UE 701 may confidently use the indicated devices for positioning. The table 1500 may be sent at stage 780 and/or at stage 710, e.g., as the mobility relationship message 715. By sending a reduced set of information (not including information regarding mobile devices), overhead and processing power may be reduced relative to sending information that includes indications of mobile devices.

A signal source determined to be mobile may be quarantined. Signals from a quarantined signal source may not be used to determine a position estimate of the observer UE 701 or may be used to determine the position estimate but result in the position estimate being identified as being of low confidence and/or being limited in use (e.g., for applications where low-accuracy position estimates are acceptable). Quarantined signal sources may be released from quarantine if appropriate, e.g., if multiple observations over time indicate that a quarantined signal source is not moving. This may help improve position estimation accuracy, e.g., by using a signal source to help determine the position estimate where the signal source would be ignored if quarantining was permanent.

Also, the determination, including updating, of the mobility status of a signal source using one technology, e.g., WiFi, may be used to assign the mobility status for the signal source for one or more other technologies, e.g., UWB, Bluetooth®, etc. Thus, signal sources whose mobility status may otherwise not be known for a particular technology may now be determined, which may help improve positioning accuracy and/or identify low-confidence position estimates and thus avoid negative consequences of relying on a low-confidence position estimate.

Referring to FIG. 16, with further reference to FIGS. 1-14, a signal source mobility status method 1600 includes the stages shown. The method 1600 is, however, an example and not limiting. The method 1600 may be altered, e.g., by having one or more stages added, removed, rearranged, combined, performed concurrently, and/or having one or more stages split into multiple stages.

At stage 1610, the method 1600 includes obtaining, at an apparatus, at least one identifier that is associated with one or more devices including a signal source that is configured to transmit wireless signals and whose mobility status is unknown to the apparatus. For example, at stage 720 the observer UE 701 may observer one or more signal sources, e.g., access points, and obtain one or more identifiers corresponding to the one or more signal sources. As another example, at stage 730, the server 400 may obtain one or more identifiers corresponding to the one or more signal sources by receipting the signal source report 732. The at least one identifier may comprise, for example, one or more network identifiers (e.g., SSID(s) for WiFi signal sources) and/or one or more device identifiers (e.g., MAC address(es) and/or EUI(s)). The processor 510, possibly in combination with the memory 530, in combination with the interface 520 (e.g., a wireless receiver and an antenna such as the wireless receiver 244 and the antenna 246), may comprise means for obtaining the at least one identifier. Also or alternatively, the processor 410, possibly in combination with the memory 411, in combination with the interface 420 (e.g., the wireless receiver 444 and the antenna 446, and/or the wired receiver 454), may comprise means for obtaining the at least one identifier.

At stage 1620, the method 1600 includes determining, at the apparatus based on the at least one identifier, whether an expected mobility status of the signal source is mobile or stationary. For example, at sub-stage 742, the observer UE 701 may determine expected mobility status of the signal source, e.g., by looking up the at least one identifier in a database such as the table 1100 or by applying the at least one identifier to a model (e.g., a machine learning model) relating identifier(s) and mobility status. As another example, using one or more of these same techniques at sub-stage 744, the server 400 may determine the expected mobility status. The processor 510, possibly in combination with the memory 530, may comprise means for determining whether the expected mobility status of the signal source is mobile or stationary. Also or alternatively, the processor 410, possibly in combination with the memory 411, may comprise means for determining whether the expected mobility status of the signal source is mobile or stationary.

Implementations of the method 1600 may include one or more of the following features. In an example implementation, the at least one identifier includes a network identifier, and determining whether the expected mobility status of the signal source is mobile or stationary comprises using the network identifier in a model relating network identifiers to corresponding expected mobility status. For example, the observer UE 701 and/or the server 400 may input the at least one identifier into a machine learning algorithm that can determine whether the at least one identifier matches with a pattern of identifiers (and possibly other information, e.g., device type, geographic region, chip manufacturer, device manufacturer, and/or purchaser, etc.), and if so, use a corresponding mobility status as the mobility status of the signal source. As another example, the observer UE 701 and/or the server 400 may compare the at least one identifier with database information, e.g., in the table 1100, to determine whether the at least one identifier matches a pattern (e.g., is within a range of identifiers, or shares a core identifier portion (e.g., "Ford" or other manufacturer name or user name) for a corresponding mobility status. In another example implementation, the at least one identifier includes a device identifier for the signal source, and wherein determining whether the expected mobility status of the signal source is mobile or stationary comprises comparing the device identifier with a first model relating device identifiers to corresponding expected mobility status. For example, similar to the discussion above, the observer UE 701 and/or the server 400 may use a model with a device identifier to determine mobility status of the signal source. In a further example implementation, the at least one identifier includes a network identifier, and wherein determining whether the expected mobility status of the signal source is mobile or stationary comprises comparing the network identifier with a second model relating network identifiers to corresponding expected mobility status. For example, the observer UE 701 and/or the server 400 may use a combination of network identifier and device identifier in a model to determine mobility status of the signal source.

Also or alternatively, implementations of the method 1600 may include one or more of the following features. In an example implementation, the method 1600 includes: collecting one or more observations regarding the mobility status of the signal source; and updating, based on the one or more observations regarding the mobility status of the signal source, one or more models relating values of at least one identifier type to the expected mobility status of the signal source. For example, at stage 750, the observer UE 701 may observe the signal source, e.g., measuring the PRS 751 and/or the PRS 752. The observation(s) may indicate that the signal source is mobile, e.g., due to different observed locations for the signal source being significantly different, or an observed location for the signal source being at a location that is significantly different from a historical location of the signal source. Alternatively, an observed signal source location similar to a historical location of the signal source, or multiple similar observed signal source locations, may help determine or confirm a stationary mobility status of the signal source. The server 400 may collect one or more observations by receiving the report 756 regarding observation(s) by the observer UE 701. At stage 780, the observer UE 701 and/or the server 400 may update a model (e.g., an machine learning algorithm and/or a database such as the table 1100, e.g., to become the table 1400) based on the observation(s), e.g., corresponding to high confidence position estimates. The processor 510, possibly in combination with the memory 530, in combination with the interface 520 (e.g., a wireless receiver and an antenna such as the wireless receiver 244 and the antenna 246), may comprise means for collecting the one or more observations. Also or alternatively, the processor 410, possibly in combination with the memory 411, in combination with the interface 420 (e.g., the wireless receiver 444 and the antenna 446, and/or the wired receiver 454), may comprise means for collecting the one or more observations. The processor 510, possibly in combination with the memory 530, may comprise means for updating the one or more models. Also or alternatively, the processor 410, possibly in combination with the memory 411, may comprise means for updating the one or more models. In another example implementation, the method 1600 includes collecting one or more observations indicative of an actual mobility status of the signal source being that the signal source is mobile; and providing an indication not to use the signal source to determine a position of a mobile device based on the one or more observations being indicative of the actual mobility status of the signal source being that the signal source is mobile. For example, one or more observations made by the observer UE 701 (and possibly provided to the server 400)

may indicate that the signal source is mobile (e.g., as discussed above). The observer UE 701 may indicate not to use the signal source to determine a position estimate for the observer UE 701 based on the signal source being mobile. For example, one portion of the processor 510 may indicate to another portion of the processor 510 not to use one or more signal (e.g., PRS) measurements to determine a position estimate for the observer UE 701. As another example, the observer UE 701 may transmit an indication to the server 400 for the server 400 not to use the signal source to determine a position estimate for the observer UE 701 based on the signal source being mobile. The server 400 may provide an indication (e.g., internally within the server 400 or externally, e.g., to the observer UE 701 and/or another entity) not to use the signal source to determine a position estimate for the observer UE 701 based on the signal source being mobile. The processor 510, possibly in combination with the memory 530, in combination with the interface 520 (e.g., a wireless receiver and an antenna such as the wireless receiver 244 and the antenna 246), may comprise means for collecting the one or more observations. Also or alternatively, the processor 410, possibly in combination with the memory 411, in combination with the interface 420 (e.g., the wireless receiver 444 and the antenna 446, and/or the wireless receiver 454), may comprise means for collecting the one or more observations. The processor 510, possibly in combination with the memory 530, possibly in combination with the interface 520 (e.g., a wireless transmitter and an antenna such as the wireless transmitter 242 and the antenna 246), may comprise means for providing the indication not to use the signal source to the determine the position of the mobile device. Also or alternatively, the processor 410, possibly in combination with the memory 411, possibly in combination with the interface 420 (e.g., the wireless transmitter 442 and the antenna 446, and/or the wired transmitter 452), may comprise means for providing the indication not to use the signal source to the determine the position of the mobile device.

Also or alternatively, implementations of the method 1600 may include one or more of the following features. In an example implementation, the method 1600 includes: determining whether a first position estimate determined using one or more signal sources expected to have respective mobility status of mobile differs by more than a threshold amount from a second position estimate determined without using at least one of the one or more signal sources expected to have respective mobility status of mobile; and indicating that a confidence is low in the first position estimate based on the first position estimate differing by more than the threshold amount from the second position estimate. For example, at stage 750, the observer UE 701 (e.g., the positioning engine 570) and/or the server 400 may determine position estimates for the observer UE 701 using one or more signal sources with expected mobility status of mobile (e.g., the mobile SS 702) and using less than all of such signal source(s). At stage 760, the observer UE 701 and/or the server 400 may determine that there is low confidence in the position estimate using the one or more mobile signal sources and indicate such (e.g., internally to the observer UE 701 and/or the server 400, from the observer UE 701 to another entity such as the server 400, and/or from the server 400 to another entity such as the observer UE 701). In this way, low confidence position estimates may be identified such that they may be used, or ignored, as appropriate, which may help provide acceptable position estimates that would not be possible without using at least one mobile signal source and/or may help avoid using unreliable position estimates which may improve any number of applications (e.g., help properly decide whether to use autonomous driving). The processor 510, possibly in combination with the memory 530, may comprise means for determining whether the first position estimate differs by more than the threshold amount from the second position estimate. Also or alternatively, the processor 410, possibly in combination with the memory 411, may comprise means for determining whether the first position estimate differs by more than the threshold amount from the second position estimate. The processor 510, possibly in combination with the memory 530, possibly in combination with the interface 520 (e.g., a wireless transmitter and an antenna such as the wireless transmitter 242 and the antenna 246), may comprise means for indicating that the confidence is low in the first position estimate. Also or alternatively, the processor 410, possibly in combination with the memory 411, possibly in combination with the interface 420 (e.g., the wireless transmitter 442 and the antenna 446, and/or the wired transmitter 452), may comprise means for indicating that the confidence is low in the first position estimate. In a further example implementation, the method 1600 further includes avoiding updating, based on the first position estimate, a model relating the at least one identifier to expected mobility status based on the first position estimate being of low confidence. For example, the observer UE 701 and/or the server 400 may not update mobility relationship information for a signal source where a position estimate for the observer UE 701 is of low confidence. This may help avoid incorrectly changing expected mobility status of a signal source, which may help avoid reliance on a mobile signal source for positioning or losing potential position estimate accuracy by ignoring a stationary signal source for determining the position estimate. The processor 510, possibly in combination with the memory 530, may comprise means for avoiding updating the model. Also or alternatively, the processor 410, possibly in combination with the memory 411, may comprise means for avoiding updating the model.

Referring also to FIG. 17, a stage 1700 that may be added to the method 1600, e.g., before stage 1610 and/or after stage 1620 comprises providing mobility information or assistance data with mobile devices filtered out. For example, the server 400 may filter out information regarding devices that the server 400 has determined to be mobile (or likely so) and/or that another device (e.g., another server) has indicated are mobile (or likely so), and provide (e.g., in the table 1500, e.g., at stage 780 and/or at stage 710 in the message 715) information/assistance data for stationary devices (e.g., UEs, APs, etc.) only so that the observer UE 701 may use this information/data in determining with which other devices to interact for positioning (e.g., to determine a position estimate of the observer UE 701 and/or to provide information to another device for determining a position estimate of the observer UE 701).

IMPLEMENTATION EXAMPLES

Implementation examples are provided in the following numbered clauses.

Clause 1. An apparatus comprising:

an interface comprising a receiver, or a transmitter, or a combination thereof;

a memory; and a processor communicatively coupled to the memory and the interface and configured to:

obtain at least one identifier that is associated with one or more devices including a signal source that is configured to transmit wireless signals and whose mobility status is unknown to the apparatus; and determine, based on the at least one identifier, whether an expected mobility status of the signal source is mobile or stationary.

Clause 2. The apparatus of clause 1, wherein the at least one identifier includes a network identifier, and wherein to determine whether the expected mobility status of the signal source is mobile or stationary the processor is configured to use the network identifier in a model relating network identifiers to corresponding expected mobility status.

Clause 3. The apparatus of clause 1, wherein the at least one identifier includes a device identifier for the signal source, and wherein to determine whether the expected mobility status of the signal source is mobile or stationary the processor is configured to use the device identifier in a first model relating device identifiers to corresponding expected mobility status.

Clause 4. The apparatus of clause 3, wherein the at least one identifier includes a network identifier, and wherein to determine whether the expected mobility status of the signal source is mobile or stationary the processor is further configured to use the network identifier in a second model relating network identifiers to corresponding expected mobility status.

Clause 5. The apparatus of clause 1, wherein the processor is further configured to:

collect one or more observations regarding the mobility status of the signal source; and update, based on the one or more observations regarding the mobility status of the signal source, one or more models relating values of at least one identifier type to the expected mobility status of the signal source.

Clause 6. The apparatus of clause 1, wherein the processor is further configured to:

collect one or more observations indicative of an actual mobility status of the signal source being that the signal source is mobile; and provide an indication not to use the signal source to determine a position of a mobile device based on the one or more observations being indicative of the actual mobility status of the signal source being that the signal source is mobile.

Clause 7. The apparatus of clause 1, wherein the processor is further configured to:

determine whether a first position estimate determined using one or more signal sources expected to have respective mobility status of mobile differs by more than a threshold amount from a second position estimate determined without using at least one of the one or more signal sources expected to have respective mobility status of mobile; and indicate that a confidence is low in the first position estimate based on the first position estimate differing by more than the threshold amount from the second position estimate.

Clause 8. The apparatus of clause 7, wherein the processor is further configured to avoid updating, based on the first position estimate, a model relating the at least one identifier to expected mobility status based on the first position estimate being of low confidence.

Clause 9. A signal source mobility status method comprising:

obtaining, at an apparatus, at least one identifier that is associated with one or more devices including a signal source that is configured to transmit wireless signals and whose mobility status is unknown to the apparatus; and determining, at the apparatus based on the at least one identifier, whether an expected mobility status of the signal source is mobile or stationary.

Clause 10. The signal source mobility status method of clause 9, wherein the at least one identifier includes a network identifier, and wherein determining whether the expected mobility status of the signal source is mobile or stationary comprises using the network identifier in a model relating network identifiers to corresponding expected mobility status.

Clause 11. The signal source mobility status method of clause 9, wherein the at least one identifier includes a device identifier for the signal source, and wherein determining whether the expected mobility status of the signal source is mobile or stationary comprises using the device identifier in a first model relating device identifiers to corresponding expected mobility status.

Clause 12. The signal source mobility status method of clause 11, wherein the at least one identifier includes a network identifier, and wherein determining whether the expected mobility status of the signal source is mobile or stationary comprises using the network identifier in a second model relating network identifiers to corresponding expected mobility status.

Clause 13. The signal source mobility status method of clause 9, further comprising:

collecting one or more observations regarding the mobility status of the signal source; and updating, based on the one or more observations regarding the mobility status of the signal source, one or more models relating values of at least one identifier type to the expected mobility status of the signal source.

Clause 14. The signal source mobility status method of clause 9, further comprising:

collecting one or more observations indicative of an actual mobility status of the signal source being that the signal source is mobile; and providing an indication not to use the signal source to determine a position of a mobile device based on the one or more observations being indicative of the actual mobility status of the signal source being that the signal source is mobile.

Clause 15. The signal source mobility status method of clause 9, further comprising:

determining whether a first position estimate determined using one or more signal sources expected to have respective mobility status of mobile differs by more than a threshold amount from a second position estimate determined without using at least one of the one or more signal sources expected to have respective mobility status of mobile; and indicating that a confidence is low in the first position estimate based on the first position estimate differing by more than the threshold amount from the second position estimate.

Clause 16. The signal source mobility status method of clause 15, further comprising avoiding updating, based on the first position estimate, a model relating the at least one identifier to expected mobility status based on the first position estimate being of low confidence.

Clause 17. An apparatus comprising:

means for obtaining at least one identifier that is associated with one or more devices including a signal source that is configured to transmit wireless signals and whose mobility status is unknown to the apparatus; and means for determining, based on the at least one identifier, whether an expected mobility status of the signal source is mobile or stationary.

Clause 18. The apparatus of clause 17, wherein the at least one identifier includes a network identifier, and wherein the means for determining whether the expected mobility status of the signal source is mobile or stationary comprise means for using the network identifier in a model relating network identifiers to corresponding expected mobility status.

Clause 19. The apparatus of clause 17, wherein the at least one identifier includes a device identifier for the signal source, and wherein the means for determining whether the expected mobility status of the signal source is mobile or stationary comprise means for using the device identifier in a first model relating device identifiers to corresponding expected mobility status.

Clause 20. The apparatus of clause 19, wherein the at least one identifier includes a network identifier, and wherein the means for determining whether the expected mobility status of the signal source is mobile or stationary comprise means for using the network identifier in a second model relating network identifiers to corresponding expected mobility status.

Clause 21. The apparatus of clause 17, further comprising:

means for collecting one or more observations regarding the mobility status of the signal source; and means for updating, based on the one or more observations regarding the mobility status of the signal source, one or more models relating values of at least one identifier type to the expected mobility status of the signal source.

Clause 22. The apparatus of clause 17, further comprising:

means for collecting one or more observations indicative of an actual mobility status of the signal source being that the signal source is mobile; and means for providing an indication not to use the signal source to determine a position of a mobile device based on the one or more observations being indicative of the actual mobility status of the signal source being that the signal source is mobile.

Clause 23. The apparatus of clause 17, further comprising:

means for determining whether a first position estimate determined using one or more signal sources expected to have respective mobility status of mobile differs by more than a threshold amount from a second position estimate determined without using at least one of the one or more signal sources expected to have respective mobility status of mobile; and means for indicating that a confidence is low in the first position estimate based on the first position estimate differing by more than the threshold amount from the second position estimate.

Clause 24. The apparatus of clause 23, further comprising means for avoiding updating, based on the first position estimate, a model relating the at least one identifier to expected mobility status based on the first position estimate being of low confidence.

Clause 25. A non-transitory, processor-readable storage medium comprising processor-readable instructions to cause a processor to:

obtain at least one identifier that is associated with one or more devices including a signal source that is configured to transmit wireless signals and whose mobility status is unknown to the apparatus; and determine, based on the at least one identifier, whether an expected mobility status of the signal source is mobile or stationary.

Clause 26. The non-transitory, processor-readable storage medium of clause 25, wherein the at least one identifier includes a network identifier, and wherein the processor-readable instructions to cause the processor to determine whether the expected mobility status of the signal source is mobile or stationary comprise processor-readable instructions to cause the processor to use the network identifier in a model relating network identifiers to corresponding expected mobility status.

Clause 27. The non-transitory, processor-readable storage medium of clause 25, wherein the at least one identifier includes a device identifier for the signal source, and wherein the processor-readable instructions to cause the processor to determine whether the expected mobility status of the signal source is mobile or stationary comprise processor-readable instructions to cause the processor to use the device identifier in a first model relating device identifiers to corresponding expected mobility status.

Clause 28. The non-transitory, processor-readable storage medium of clause 27, wherein the at least one identifier includes a network identifier, and wherein the processor-readable instructions to cause the processor to determine whether the expected mobility status of the signal source is mobile or stationary comprise use the network identifier in a second model relating network identifiers to corresponding expected mobility status.

Clause 29. The non-transitory, processor-readable storage medium of clause 25, further comprising processor-readable instructions to cause the processor to:

collect one or more observations regarding the mobility status of the signal source; and update, based on the one or more observations regarding the mobility status of the signal source, one or more models relating values of at least one identifier type to the expected mobility status of the signal source.

Clause 30. The non-transitory, processor-readable storage medium of clause 25, further comprising processor-readable instructions to cause the processor to:

collect one or more observations indicative of an actual mobility status of the signal source being that the signal source is mobile; and provide an indication not to use the signal source to determine a position of a mobile device based on the one or more observations being indicative of the actual mobility status of the signal source being that the signal source is mobile.

Clause 31. The non-transitory, processor-readable storage medium of clause 25, further comprising processor-readable instructions to cause the processor to:

determine whether a first position estimate determined using one or more signal sources expected to have respective mobility status of mobile differs by more than a threshold amount from a second position estimate determined without using at least one of the one or more signal sources expected to have respective mobility status of mobile; and indicate that a confidence is low in the first position estimate based on the first position estimate differing by more than the threshold amount from the second position estimate.

32. The non-transitory, processor-readable storage medium of clause 31, further comprising processor-readable instructions to cause the processor to avoid updating, based on the first position estimate, a model relating the at least one identifier to expected mobility status based on the first position estimate being of low confidence.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices (also called wireless communications devices). A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
an interface comprising a receiver, or a transmitter, or a combination thereof;
a memory; and
a processor communicatively coupled to the memory and the interface and configured to:
obtain at least one identifier that is associated with one or more devices including a signal source that is configured to transmit wireless signals and whose mobility status is unknown to the apparatus, wherein the at least one identifier is a network identifier or a device identifier;
determine, based on the at least one identifier, whether an expected mobility status of the signal source is mobile or stationary;
determine whether a first position estimate determined using one or more signal sources expected to have respective mobility status of mobile differs by more than a threshold amount from a second position estimate determined without using at least one of the one or more signal sources expected to have respective mobility status of mobile; and
indicate that a confidence is low in the first position estimate based on the first position estimate differing by more than the threshold amount from the second position estimate.

2. The apparatus of claim 1, wherein to determine whether the expected mobility status of the signal source is mobile or stationary the processor is configured to use the network identifier in a model relating network identifiers to corresponding expected mobility status.

3. The apparatus of claim 1, wherein to determine whether the expected mobility status of the signal source is mobile or stationary the processor is configured to use the device identifier in a first model relating device identifiers to corresponding expected mobility status.

4. The apparatus of claim 3, wherein to determine whether the expected mobility status of the signal source is mobile or stationary the processor is further configured to use the network identifier in a second model relating network identifiers to corresponding expected mobility status.

5. The apparatus of claim 1, wherein the processor is further configured to:
collect one or more observations regarding the mobility status of the signal source; and
update, based on the one or more observations regarding the mobility status of the signal source, one or more models relating values of at least one identifier type to the expected mobility status of the signal source.

6. The apparatus of claim 1, wherein the processor is further configured to:
collect one or more observations indicative of an actual mobility status of the signal source being that the signal source is mobile; and
provide an indication not to use the signal source to determine a position of a mobile device based on the one or more observations being indicative of the actual mobility status of the signal source being that the signal source is mobile.

7. The apparatus of claim 1, wherein the processor is further configured to avoid updating, based on the first position estimate, a model relating the at least one identifier to expected mobility status based on the first position estimate being of low confidence.

8. An apparatus comprising:
means for obtaining at least one identifier that is associated with one or more devices including a signal source that is configured to transmit wireless signals and whose mobility status is unknown to the apparatus, wherein the at least one identifier is a network identifier or a device identifier;
means for determining, based on the at least one identifier, whether an expected mobility status of the signal source is mobile or stationary;
means for determining whether a first position estimate determined using one or more signal sources expected to have respective mobility status of mobile differs by more than a threshold amount from a second position estimate determined without using at least one of the one or more signal sources expected to have respective mobility status of mobile; and
means for indicating that a confidence is low in the first position estimate based on the first position estimate differing by more than the threshold amount from the second position estimate.

9. The apparatus of claim 8, wherein the means for determining whether the expected mobility status of the signal source is mobile or stationary comprise means for using the network identifier in a model relating network identifiers to corresponding expected mobility status.

10. The apparatus of claim 8, wherein the means for determining whether the expected mobility status of the signal source is mobile or stationary comprise means for using the device identifier in a first model relating device identifiers to corresponding expected mobility status.

11. The apparatus of claim 10, wherein the means for determining whether the expected mobility status of the signal source is mobile or stationary comprise means for using the network identifier in a second model relating network identifiers to corresponding expected mobility status.

12. The apparatus of claim 8, further comprising:
means for collecting one or more observations regarding the mobility status of the signal source; and
means for updating, based on the one or more observations regarding the mobility status of the signal source, one or more models relating values of at least one identifier type to the expected mobility status of the signal source.

13. The apparatus of claim 8, further comprising:
means for collecting one or more observations indicative of an actual mobility status of the signal source being that the signal source is mobile; and
means for providing an indication not to use the signal source to determine a position of a mobile device based on the one or more observations being indicative of the actual mobility status of the signal source being that the signal source is mobile.

14. The apparatus of claim 8, further comprising:
means for determining whether a first position estimate determined using one or more signal sources expected to have respective mobility status of mobile differs by more than a threshold amount from a second position estimate determined without using at least one of the one or more signal sources expected to have respective mobility status of mobile; and
means for indicating that a confidence is low in the first position estimate based on the first position estimate differing by more than the threshold amount from the second position estimate.

15. The apparatus of claim 14, further comprising means for avoiding updating, based on the first position estimate, a model relating the at least one identifier to expected mobility status based on the first position estimate being of low confidence.

16. A non-transitory, processor-readable storage medium comprising processor-readable instructions to cause a processor to:
obtain at least one identifier that is associated with one or more devices including a signal source that is configured to transmit wireless signals and whose mobility status is unknown to the apparatus, wherein the at least one identifier is a network identifier or a device identifier;
determine, based on the at least one identifier, whether an expected mobility status of the signal source is mobile or stationary;

determine whether a first position estimate determined using one or more signal sources expected to have respective mobility status of mobile differs by more than a threshold amount from a second position estimate determined without using at least one of the one or more signal sources expected to have respective mobility status of mobile; and
indicate that a confidence is low in the first position estimate based on the first position estimate differing by more than the threshold amount from the second position estimate.

17. The non-transitory, processor-readable storage medium of claim 16, wherein the processor-readable instructions to cause the processor to determine whether the expected mobility status of the signal source is mobile or stationary comprise processor-readable instructions to cause the processor to use the network identifier in a model relating network identifiers to corresponding expected mobility status.

18. The non-transitory, processor-readable storage medium of claim 16, wherein the processor-readable instructions to cause the processor to determine whether the expected mobility status of the signal source is mobile or stationary comprise processor-readable instructions to cause the processor to use the device identifier in a first model relating device identifiers to corresponding expected mobility status.

19. The non-transitory, processor-readable storage medium of claim 18, wherein the processor-readable instructions to cause the processor to determine whether the expected mobility status of the signal source is mobile or stationary comprise use the network identifier in a second model relating network identifiers to corresponding expected mobility status.

20. The non-transitory, processor-readable storage medium of claim 16, further comprising processor-readable instructions to cause the processor to:
collect one or more observations regarding the mobility status of the signal source; and
update, based on the one or more observations regarding the mobility status of the signal source, one or more models relating values of at least one identifier type to the expected mobility status of the signal source.

21. The non-transitory, processor-readable storage medium of claim 16, further comprising processor-readable instructions to cause the processor to:
collect one or more observations indicative of an actual mobility status of the signal source being that the signal source is mobile; and
provide an indication not to use the signal source to determine a position of a mobile device based on the one or more observations being indicative of the actual mobility status of the signal source being that the signal source is mobile.

* * * * *